G. H. JACKSON.
CLUTCH MECHANISM.
APPLICATION FILED MAY 8, 1913.

1,088,425.

Patented Feb. 24, 1914.

Witnesses:
Gertrude Porter.
May T. McGarry.

Inventor
Graham H. Jackson
By his Attorney
Carl Benjamin

UNITED STATES PATENT OFFICE.

GRAHAM H. JACKSON, OF NEWARK, NEW JERSEY, ASSIGNOR TO UNIVERSAL TOBACCO MACHINE COMPANY, A CORPORATION OF NEW YORK.

CLUTCH MECHANISM.

1,088,425.  Specification of Letters Patent.  Patented Feb. 24, 1914.

Application filed May 8, 1913. Serial No. 766,255.

*To all whom it may concern:*

Be it known that I, GRAHAM H. JACKSON, a citizen of the United States, residing at Newark, in the county of Essex and State of New Jersey, have invented a certain new and useful Improvement in Clutch Mechanisms, of which the following is a specification.

The invention is a friction clutch mechanism. The construction is such that oppositely disposed plane faces of a member movable on a support fixed on the shaft to be driven are moved into frictional engagement with similar faces of a driven member loose on said shaft: whereby the device is rendered quick and powerful in engagement and noiseless in operation.

Figures 1, 3:
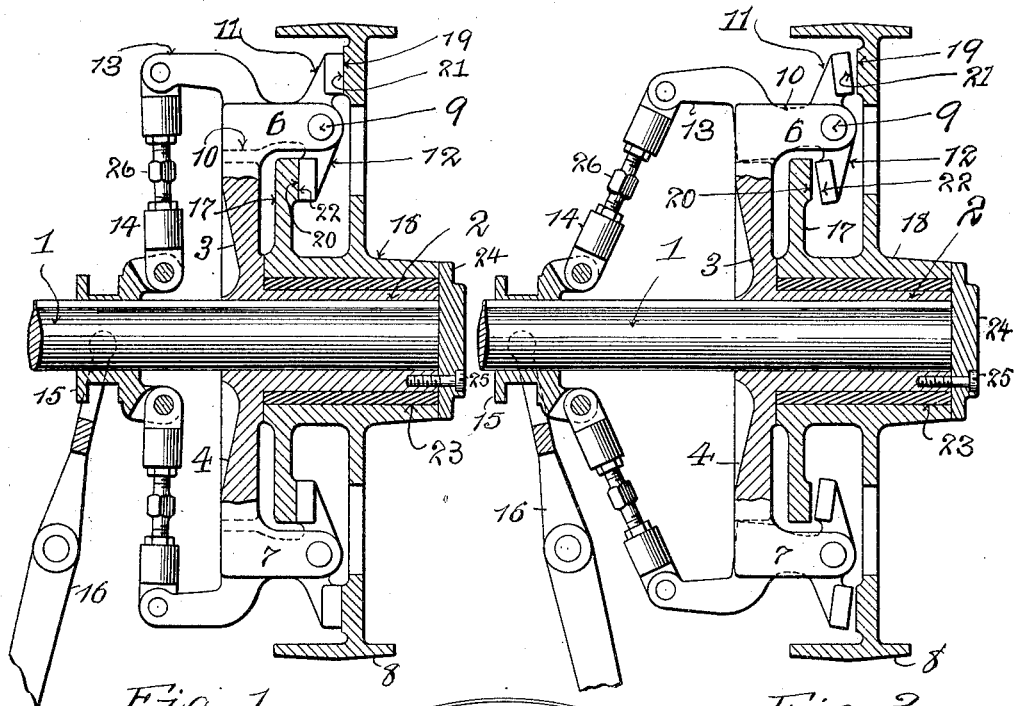
Figure 2:
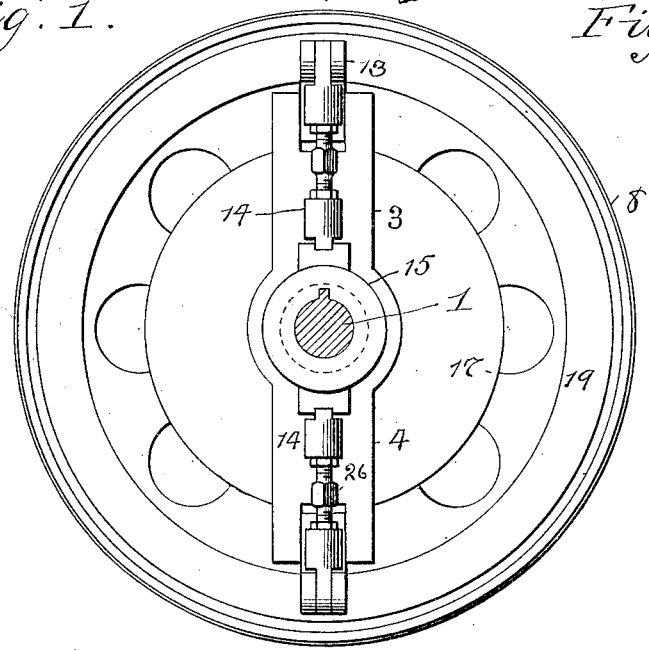

In the accompanying drawings—Figure 1 is a diametral cross section, showing the clutch engaged. Fig. 2 is a face elevation. Fig. 3 is a section similar to Fig. 1, showing the clutch released.

Similar numbers of reference indicate like parts.

1 is the shaft to be driven. 2 is a sleeve splined to said shaft. Preferably integral with said sleeve are arms 3 and 4, bifurcated and provided with lateral projections 6, 7 at their ends, extending toward the loose driven pulley 8. Between said projections on each arm is pivoted at 9 a bell crank lever 10 having three arms 11, 12, 13. The arms 13 are connected by links 14 to the collar 15 which slides on splined shaft 1 and is operated by the usual pivoted yoke lever 16.

The driven pulley 8 and a disk 17 are preferably integral with the hub 18. The face 19 of pulley 8 is disposed parallel to the face 20 of disk 17. The pivot 9 of lever 10 is preferably located between said faces. A face 21 of lever arm 11 is disposed in front of face 19 of pulley 8. A face 22 of lever arm 12 is disposed in front of face 20 of disk 17. The hub 18 turns freely on a brass sleeve 23 received on sleeve 2. At the end of shaft 1 is a cap plate 24 secured to sleeve 2 by screws, one of which is shown at 25.

When the collar 15 is in the position shown in Fig. 1, the links 14 then being in line, the faces 21, 22 of lever arms 11, 12 are brought into frictional coöperation with the faces 19, 20 of pulley 8 and disk 17, and the rotation of pulley 8 is thus transmitted through arms 3, 4 to sleeve 2 and shaft 1. When the collar 15 is moved to cause the links 14 to stand at an angle to one another, as shown in Fig. 2, the faces 21, 22 are moved out of engagement with the faces 19, 20, and the rotation of pulley 8 is, therefore, no longer transmitted to shaft 1.

The extent of movement of lever arms 10, 11 may be adjusted by means of the screws 26 interposed in links 14.

I claim:

1. A clutch mechanism, comprising a shaft, a driven member loose thereon, having two faces oppositely disposed and in planes at right angles to said shaft, a support fast on said shaft, a member pivoted on said support, having faces respectively disposed in front of said loose member faces, and means for moving said pivoted member to bring its faces into frictional coöperation with the faces of said loose member.

2. A clutch mechanism, comprising a shaft, a driven member loose thereon, having two faces oppositely disposed, a support fast on said shaft, a member pivoted on said support between the faces of said loose member and having faces respectively disposed in front of said loose member faces, and means for moving said pivoted member to bring its faces into frictional coöperation with the faces of said loose member.

3. A clutch mechanism, comprising a shaft, a driven member loose thereon, having two disks with faces oppositely disposed, a support fast on said shaft, a member pivoted on said support and having faces respectively disposed in front of said loose member faces, and means for rocking said pivoted member to move its said faces into and out of frictional coöperation with said disk faces.

4. A clutch mechanism, comprising a shaft, a hub loose thereon, a driven pulley, and a disk on said hub, having oppositely disposed faces, a support fast on said shaft, a two-armed lever pivoted on said support, having the faces of its arms respectively disposed in front of the said faces of said disk and pulley, and means for actuating said lever to move its said faces into and out of frictional coöperation with said pulley and disk faces.

5. A clutch mechanism, comprising a shaft, a hub loose thereon, a driven pulley, and a disk on said hub, having oppositely disposed faces, a support fast on said shaft, a three-armed lever pivoted on said support, having the faces of two of its arms respectively disposed in front of the said faces of said disk and pulley, and means connected to the third arm of said lever for actuating the same to move its said faces into and out of frictional coöperation with said pulley and disk faces.

6. A clutch mechanism, comprising a shaft, a driven member loose thereon, having two faces oppositely disposed, a support fast on said shaft, a member movable on said support, having faces respectively disposed in front of said loose member faces, means for moving said pivoted member to bring its faces into frictional coöperation with the faces of said loose member, and means for varying the extent of movement of said pivoted member.

In testimony whereof I have affixed my signature in presence of two witnesses.

GRAHAM H. JACKSON.

Witnesses:
GERTRUDE T. PORTER,
MAY T. McGARRY.